Figure 1:
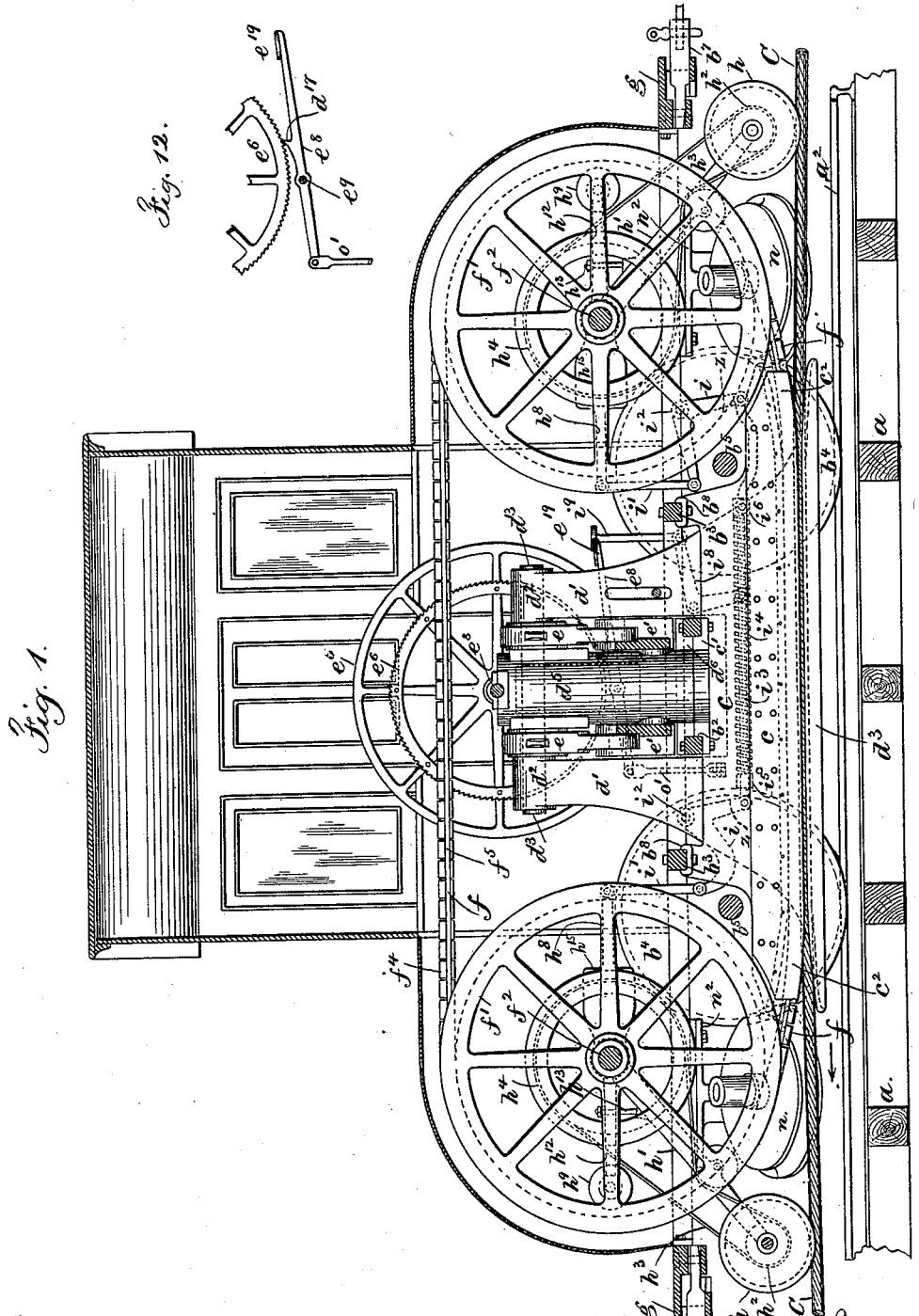

(No Model.) 7 Sheets—Sheet 2.
C. TIERS, J. H. PENDLETON & A. BRYSON, Jr.
GRIP FOR CABLE RAILWAYS.

No. 404,576. Patented June 4, 1889.

(No Model.) 7 Sheets—Sheet 3.
C. TIERS, J. H. PENDLETON & A. BRYSON, Jr.
GRIP FOR CABLE RAILWAYS.

No. 404,576. Patented June 4, 1889.

Witnesses,
Chas H Smith
J. Staib

Inventors
John H. Pendleton
Andrew Bryson Jr.
per Cornelius Tiers
Lemuel W. Serrell
atty (No Model.) 7 Sheets—Sheet 4.
C. TIERS, J. H. PENDLETON & A. BRYSON, Jr.
GRIP FOR CABLE RAILWAYS.
No. 404,576. Patented June 4, 1889.

Witnesses.
Chas. H. Smith
J. Haib

Inventors
John H. Pendleton
Andrew Bryson Jr.
Cornelius Tiers
Lemuel W. Serrell
atty

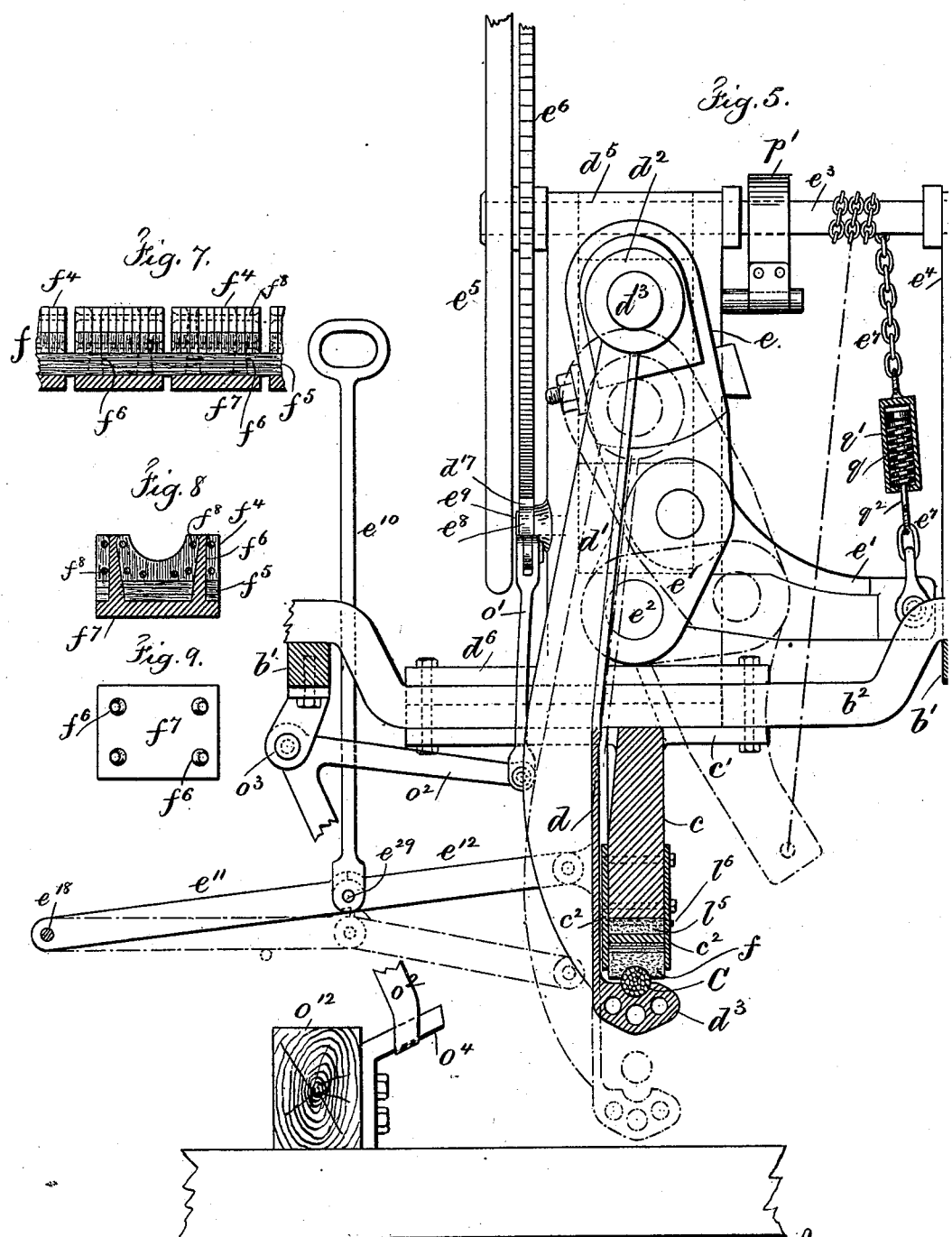

(No Model.) 7 Sheets—Sheet 6.
C. TIERS, J. H. PENDLETON & A. BRYSON, Jr.
GRIP FOR CABLE RAILWAYS.

No. 404,576. Patented June 4, 1889.

Fig. 6.

Fig. 13.

Witnesses
Chas N Smith
J. Haib

Inventors
John H. Pendleton
Andrew Bryson Jr
Cornelius Tiers
per Lemuel W. Serrell
Atty (No Model.) 7 Sheets—Sheet 7.
C. TIERS, J. H. PENDLETON & A. BRYSON, Jr.
GRIP FOR CABLE RAILWAYS.
No. 404,576. Patented June 4, 1889.
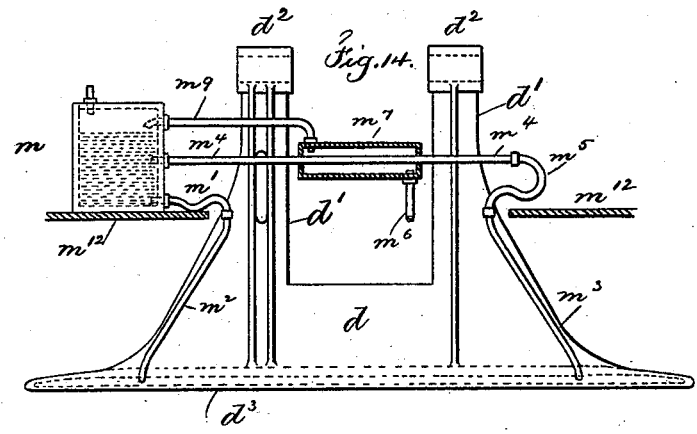
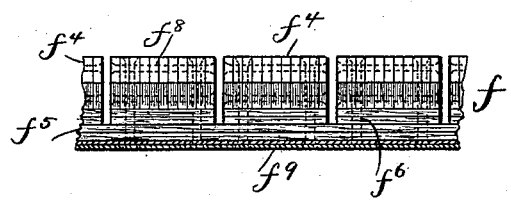

UNITED STATES PATENT OFFICE.

CORNELIUS TIERS, OF NEW YORK, JOHN H. PENDLETON, OF BROOKLYN, AND ANDREW BRYSON, JR., OF NEW YORK, ASSIGNORS TO THE RAPID TRANSIT CABLE COMPANY, OF NEW YORK, N. Y.

GRIP FOR CABLE RAILWAYS.

SPECIFICATION forming part of Letters Patent No. 404,576, dated June 4, 1889.

Application filed July 21, 1888. Serial No. 280,658. (No model.)

*To all whom it may concern:*

Be it known that we, CORNELIUS TIERS, of the city and State of New York, JOHN H. PENDLETON, of Brooklyn, in the State of New York, and ANDREW BRYSON, Jr., of the city and State of New York, have invented an Improvement in Grips for Cable Railways, of which the following is a specification.

Our grip is designed for use upon a special car of each train of cars, and this special car, which we term a "motor-car," is to be connected by the grip to the traveling cable, and the cars connected to said motor-car are drawn or pushed by said motor-car as the latter is drawn along by the cable. As there is but one grip for all the cars of the train, we make the clamping portions of the grip very long and employ toggle-levers to act upon the moving part of the grip, which levers are so arranged that the cable is clamped with great pressure between the stationary and moving part of the grip. The moving portion of the grip is fitted to be raised and lowered vertically, and said moving portion is suspended from a shaft, so that after said moving portion is lowered said moving part may be swung upon its shaft to move the hook of said moving part from beneath the cable to drop the latter, or said hook, if above the cable, may be lowered, swung under the cable, and then lifted when it is desired to pick up the cable. We employ an endless belt suitably mounted, against the outer surface of which the cable is clamped by the moving portion of the grip, the inner surface of said belt being pressed against the stationary part of the grip. We provide for putting this belt in motion so as to have the same moving at about the same speed as the cable when the grip is to be applied. To prevent the hook of the grip being heated and worn by the friction of the cable, we cause water or other fluid to circulate through the interior of said hook and keep said hook cool. We also provide for dropping and picking up the cable automatically at the ends of sections of the cable railway and for preventing injury to the hook of the grip when turning curves, as fully explained hereinafter.

Figure 2:
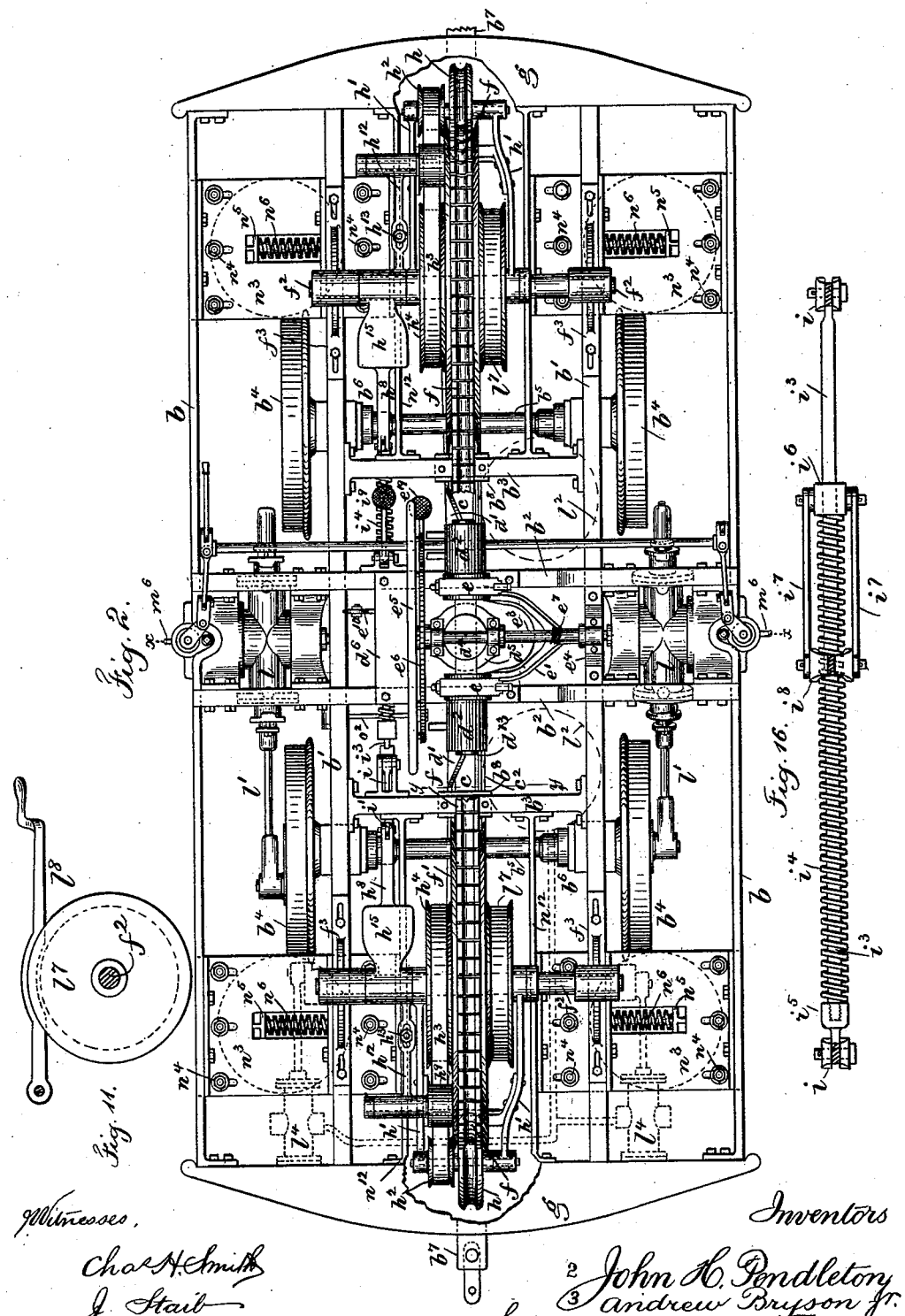
Figure 3:
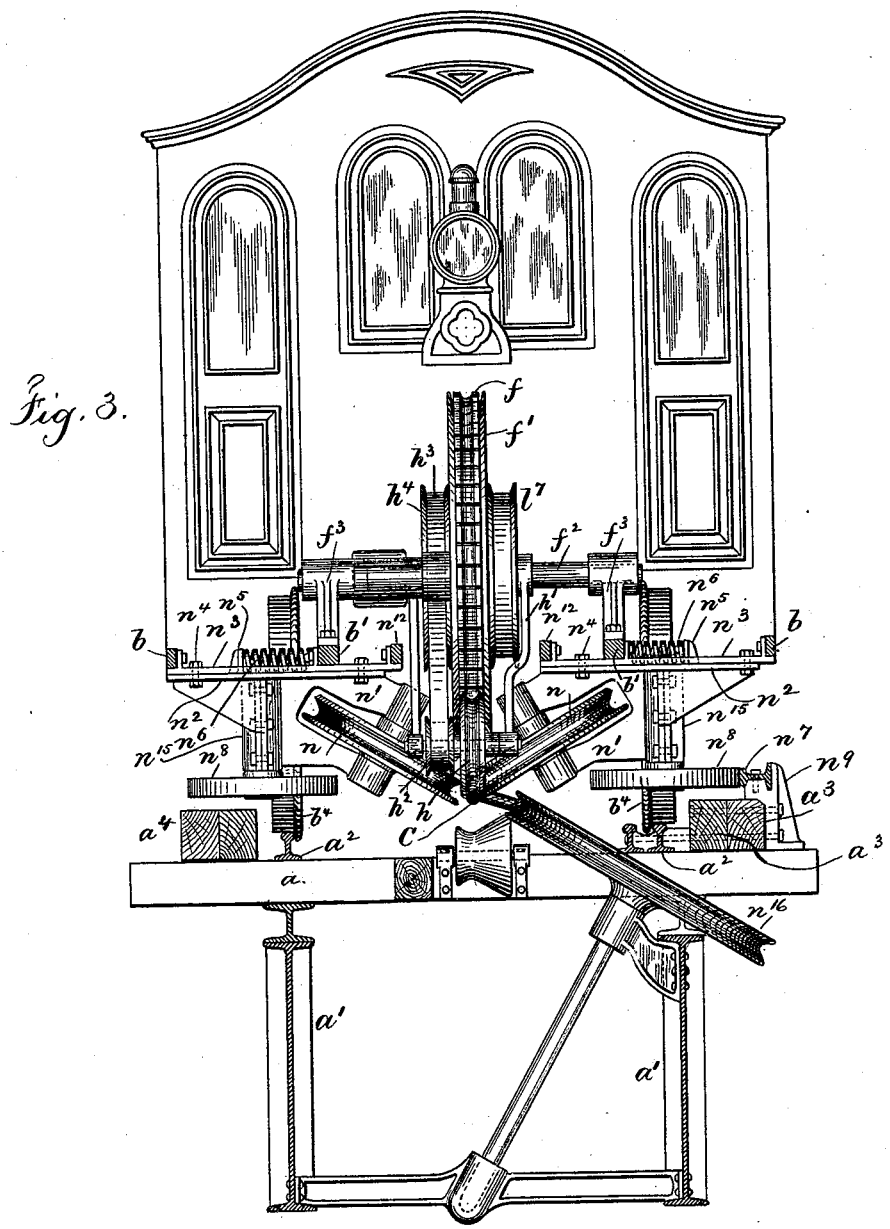
Figures 4, 15:
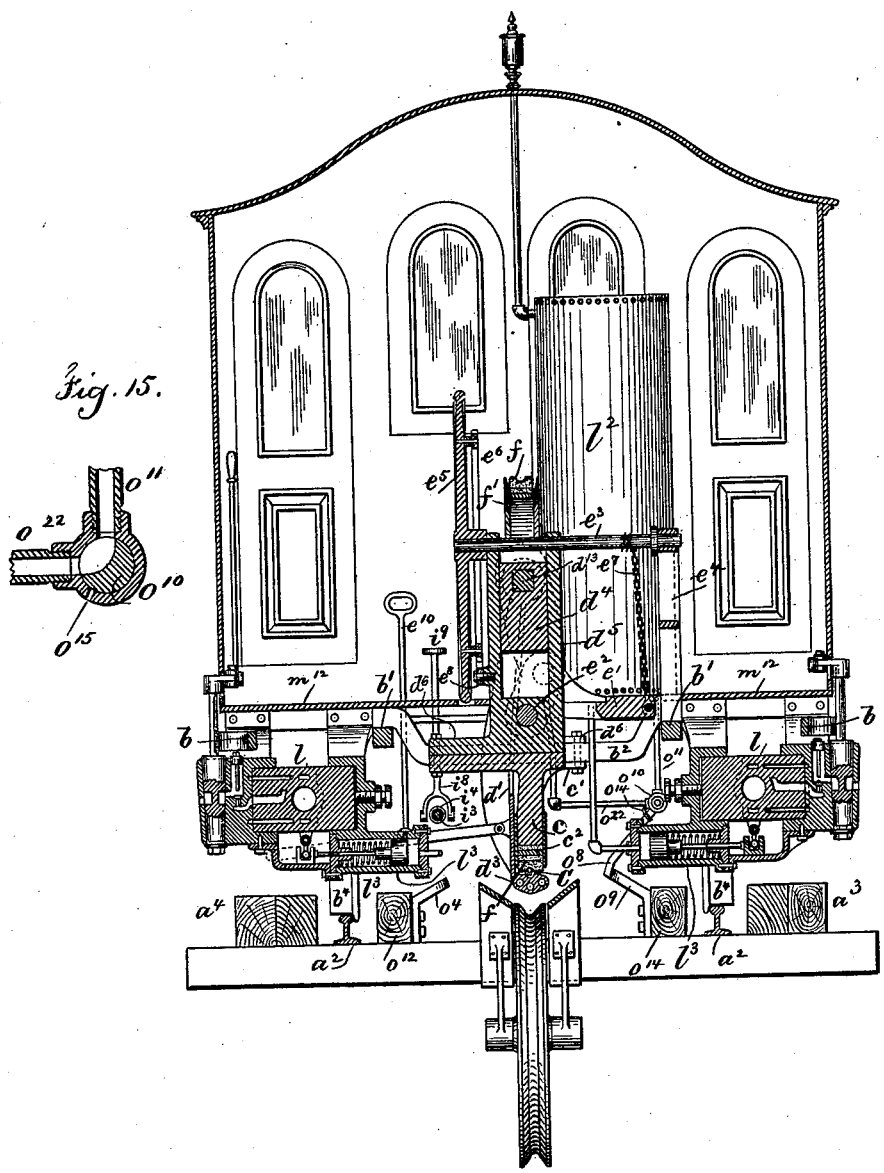

In the drawings, Figure 1 is an elevation, partly in section, of the motor-car and grip. Fig. 2 is a plan of the same, the cab of the car and the flooring not being shown. For greater clearness a portion of the endless belt is not represented in this figure. Fig. 3 is a cross-section of the elevated-railway structure at a curved portion of the road and an end view partially in section of the motor-car. Fig. 4 is a section of the car and grip at the line $xx$ of Fig. 2, the car being shown as upon a straight portion of the road. Fig. 5 is a section at the line $yy$ of Fig. 2, the parts being represented in larger size. Fig. 6 is a plan view of a curved portion of the road, illustrating the position of the grip and cable as the car travels upon said curved portion. Figs. 7 and 8 are longitudinal and cross-sections, respectively, of portions of the endless belt of the grip. Fig. 9 is an elevation of the metal plate and its pins for connecting one of the blocks of leather to the endless band. Figs. 10 and 10$^A$ are sections of modifications of the endless belt. Fig. 11 is an elevation of the brake-wheel and brake. Fig. 12 is an elevation of the pawl-lever and a portion of the ratchet-wheel which it holds. Fig. 13 is a plan of the cable roadway at the terminals of sections of the cable railway. Fig. 14 is an elevation of the moving part of the grip detached, showing the arrangement of pipes for water or other fluid to circulate through the hook of the grip. Fig. 15 is a section of the cock for admitting compressed air to the plunger of the moving part of the grip. Fig. 16 is a sectional plan at the line $zz$ of Fig. 1.

$a$ represents the cross-ties of the elevated-railway structure; $a'$, the girders for sustaining the same; $a^2$, the rails of the track, and $a^3$ and $a^4$ the outer, and $o^{12}$ and $o^{14}$ the inner, wooden guard-rails, all of usual character. (See Fig. 4.)

The frame of the car for supporting the grip and its parts is composed of the longitudinal beams $b\ b\ b'\ b'$, transverse beams $b^2\ b^2$, tie-bars $b^3\ b^3$, and end sills $g\ g$. These beams, tie-bars, and end sills are preferably of wrought metal, and they are to be bolted together in any desired manner.

$b^4\ b^4$ are the wheels of the car upon axles $b^5\ b^5$ in journal-boxes $b^6\ b^6$ upon the beams $b'\ b'$.

$b^7\ b^7$ are draw-bars connected to the end sills, and a train of cars may be connected to either end sill of the motor-car, as the grip and its parts are so arranged that the motor-car may be drawn either end forward.

$c$ is the stationary part of the grip, preferably of the shape shown in Fig. 1, and this part $c$ depends from and is cast in one with the plate $c'$, which plate is bolted to the beams $b^2\ b^2$. As a further support for this stationary part of the grip we provide lugs at $b^8$ upon said part $c$, and bolts pass through these lugs and through the tie-bars $b^3$ and connect said stationary part of the grip with said tie-bars.

$c^2\ c^2$ are plates at opposite sides of and bolted to the part $c$, and these plates project beyond the lower part of $c$ and form a groove that extends nearly the entire length of the stationary part of the grip. This groove is in line with the endless cable C, and said groove forms a passage-way for the endless belt $f$, hereinafter described.

The moving part of the grip is composed of a plate $d$, arms $d'\ d'$, hubs $d^2\ d^2$, and a hook portion $d^3$, extending at right angles to the plate $d$. (See Fig. 5.) Said arms, plate, hubs, and hook may be made in one of cast metal, or the hook may be a separate piece from the arms, hubs, and plate and bolted to the plate. We prefer to make the hook of the grip of hardened steel; but it may be made of aluminum bronze. The surface of the groove of the hook is to be as smooth as possible, so as to lessen the friction of the cable on the hook. The hook $d^3$ is of about the same length as the lower portion of the stationary part of the grip, and said hook has a nearly semicircular groove in its upper surface, which groove extends the entire length of the hook, and the cable occupies the groove when said cable is being raised or lowered by the hook. The hubs $d^2\ d^2$ receive the cylindrical ends of the shaft $d^{13}$, and said shaft has a square portion where it passes through the plunger $d^4$, and also where it passes through guide-slots in the cylinder $d^5$. The plunger $d^4$ moves vertically in the cylinder $d^5$, and said cylinder is upon a plate $d^6$, that is supported by the beams $b^2$, and said plate $d^6$ is of the same shape as the plate $c'$ of the stationary part of the grip, and the same bolts that connect the plate $c'$ to the beams $b^2$ also secure the plate $d^6$ to said beams.

$e\ e$ are arms loose upon the shaft $d^{13}$, and said arms are connected to the short arms of a forked lever $e'$, which lever is pivoted at $e^2$.

$e^3$ is a shaft supported in bearings upon the cylinder $d^5$ and upon a standard $e^4$, and this shaft has a hand-wheel $e^5$ and a ratchet-wheel $e^6$, and a chain $e^7$ is connected to this shaft $e^3$ and to the outer end of the long arm of the forked lever $e'$. There is a lever $e^8$ pivoted at $e^9$ to the cylinder $d^5$, and this lever has a tooth $d^{17}$ to take into the ratchet-wheel $e^6$ to keep said wheel and its shaft from turning, and at one end of said lever $e^8$ there is foot-piece $e^{19}$.

It is now to be understood that when the grip is to be operated the engineer first moves the lever $e^8$ with his foot and disconnects the tooth of said lever from the ratchet-wheel $e^6$, and if the cable is to be dropped he releases his hold upon the hand-wheel $e^5$, when the weight of the moving parts causes said parts and the plunger $d^4$ to descend from the position shown by full lines in Fig. 5 to that shown by dotted lines in same figure. The hook $d^3$ of the grip drops sufficiently below the cable to allow said hook to be moved from beneath the latter without striking it, and if it is desired to raise the hook above the cable the engineer pulls upon the rod $e^{10}$, which, through the links $e^{11}\ e^{12}$, swings the moving portion of the grip upon its pivot-shaft $d^{13}$ and moves the hook $d^3$ out from beneath the cable. The engineer now turns the hand-wheel $e^5$, which winds up the chain $e^7$ upon the shaft $e^3$, and in so doing straightens out the toggle $e'\ e$ and lifts the plunger and moving part of the grip. As said moving part is lifted the links $e^{11}\ e^{12}$ are gradually brought into line with each other, and the weight of said moving part of the grip causes said moving part to swing upon its pivot-shaft, and the hook $d^3$ passes above the cable and below the stationary part of the grip.

If it is desired to pick up the cable, the moving part of the grip is first swung upon its shaft by a pull upon the rod $e^{10}$ to move the hook from beneath the stationary part of the grip. Then the moving part of the grip is lowered, as before described, and by pressing upon the rod $e^{10}$ the links $e^{11}\ e^{12}$ are straightened and the moving part of the grip swung so as to bring the hook $d^3$ beneath the cable. The hand-wheel $e^5$ is now turned by the engineer, which rotates the shaft $e^3$ and winds the chain $e^7$ thereon, straightening out the toggle $e'\ e$, and lifting the plunger and moving part of the grip, and also the cable that occupies the groove of the hook $d^3$. The link $e^{11}$ swings upon a fixed pivot $e^{18}$, and the link $e^{12}$ is pivoted to the plate $d$ of the moving part of the grip, and the two links are connected by a joint $e^{29}$, having stops similar to a rule-joint, so that said links will stop moving upon said joint $e^{29}$ as soon as the links are in line with each other. The cable as brought up by the hook $d^3$ is not clamped by said hook directly against the stationary portion of the grip, but it is brought against the outer surface of an endless belt $f$, which belt is so mounted that a portion of the belt occupies the groove in the lower part of the stationary portion of the grip; hence the hook presses the cable against the outer surface of the endless belt, and the inner surface of said belt is pressed against the under surface of the stationary part of the grip when the cable is clamped by the grip. The endless belt $f$ passes around and is carried by the drums $f'\ f'$, that are upon shafts $f^2\ f^2$, fitted to turn in boxes or bearings upon standards $f^3\ f^3$, bolted to the beams $b'$, and the holes in the base of said standards for the attaching-bolts are slotted, so that said standards may be adjusted in position upon said beams $b'$. The endless belt $f$ is composed of two or more bands of leather $f^5$, or leather and canvas combined, to which are secured blocks of leather $f^4$ by metal pins $f^6$, that pass through the bands $f^5$ and blocks $f^4$. The pins $f^6$ for each block of leather are upon a plate $f^7$, and said plate and pins are preferably in one of malleable cast-iron, and the pins after being passed through the holes formed for them in the bands and blocks have their ends spread, so as to firmly secure the blocks to the bands $f^5$. Instead of spreading the ends of the pins $f^6$ to secure the blocks in place, said pins may have holes for the passage of wires or keys $f^{13}$, each wire passing through the leather block and through two pins of each plate, as shown in Fig. 10^A. The ends of the wire where they project beyond the leather block are bent over or otherwise secured to keep them in place. By this arrangement, if a plate $f^7$ or leather block become worn or injured, it may be removed by first taking out the wires $f^{13}$ and then withdrawing the pins $f^6$ and another block substituted. We prefer to employ a sheet-metal case $f^{14}$ to surround four sides and a portion of the top of each leather block (see Fig. 10^A) to keep said block from spreading by the action of the cable, and this metal case may be held in place by the wires $f^{13}$, passing through holes in said case, the ends of the wires being bent down outside said case. We remark that the endless belt just described is not of itself claimed herein, but the same forms the subject of an application for patent filed by J. H. Pendleton, C. Tiers, A. Bryson, Jr., and L. Moss November 13, 1888, Serial No. 290,740.

Each block of leather is formed of a number of pieces of leather secured together by rivets $f^8$, and the outer surface of each block has a nearly semicircular groove in it running lengthwise of the block, and the grooves of the respective blocks are in line with each other, so that there is a continuous groove extending the entire length of the outer surface of the belt. When the cable is clamped, it occupies the groove in the hook and the groove in the endless belt; hence the cable is prevented from moving sidewise in the grip.

Instead of employing the plates $f^7$ to form the inner surface of the endless belt $f$, as shown in Figs. 7 and 8, said plates may be replaced by two or more bands of steel $f^9$, as shown in Fig. 10, the blocks $f^4$, leather bands $f^5$, and steel bands being connected together by rivets, and to give greater flexibility to this form of belt some of the bands $f^5$ may be cut in line with the spaces between the blocks, as shown in said Fig. 10.

In order to set the endless belt in motion and have it moving at about the same speed as the cable, so as to prevent injury to either grip or cable when the latter is being clamped by the grip, we employ a wheel $h$ upon an arm $h'$, that is fitted to swing upon the shaft $f^2$, and said arm is connected to an arm $h^{12}$ of the lever $h^8$ by a pin $h^{13}$, that passes through a slot in the arm $h^{12}$ and has a head that comes above said arm $h^{12}$, and the arm $h^{12}$ carries a roller or pulley $h^9$. Upon the axle of the wheel $h$ there is a pulley $h^2$ for a belt $h^3$, that passes over a pulley $h^4$ upon the shaft $f^2$. There is a wheel $h$, pulleys $h^2$ and $h^4$, belt $h^3$, arms $h'$ and $h^{12}$, and lever $h^8$ for each drum $f'$, and when the wheels $h$ are brought in contact with the cable, as next described, said wheels are put in motion, and by the pulleys $h^2 h^4$ and belt $h^3$ the shafts $f^2$ and drums $f'$ are rotated and the endless belt $f$ put in motion.

$i\ i$ are bent levers, pivoted at $i^2\ i^2$, and one end of each lever is connected to a lever $h^8$ by a link $i'$.

$i^3$ is a rod, the outer ends of which are connected to the levers $i\ i$, and around this rod there is a spring $i^4$ between the fixed collar $i^5$ and the loose collar $i^6$.

$i^7\ i^7$ are links connected to the loose collar $i^6$ and forked ends of the bent lever $i^8$, and $i^9$ is a foot-piece connected to said lever $i^8$.

It is now to be understood that when the foot-piece $i^9$ is depressed by the engineer the lever $i^8$ swings upon its pivot, and by the links $i^7\ i^7$ the rod $i^3$ is moved. This latter swings the levers $i\ i$, and by the links $i'\ i'$ the levers $h^8\ h^8$ and arms $h^{12}$ are moved, so that the rollers or pulleys $h^9\ h^9$ at the ends of said arms $h^{12}$ are moved downward. The arms $h^{12}$ in moving allow the arms $h'$ to drop, and said arms $h'$ drop until the wheels $h$ are brought into contact with the cable which puts them in rotation; but the belts $h^3$ are at this time too slack to turn their pulleys $h^4$. When the levers $h^8$ receive their extreme movement, the rollers $h^9$ are in contact with the belts $h^3$ and tighten them sufficiently, so that they will be put in motion by the revolution of the wheels $h$, and thereby rotate the shafts $f^2$, drums $f'$, and endless belt $f$.

To insure the rotation of the endless belt $f$ while the grip is being applied, the engineer must keep the foot-piece $i^9$ depressed and the wheels $h$ in contact with the cable until the latter is lifted and clamped between the two parts of the grip. If the wheels $h$ were kept down to their lowest point while the cable is being lifted by the grip, it might cause a bend in the cable between each wheel and the ends of the grip.

We provide for allowing the wheels $h$ to rise with the cable as the latter is lifted, as next explained.

The spring $i^4$ around the rod $i^3$ is sufficiently strong so as not to be compressed during the movement of the parts while the wheels $h$ are being lowered to the cable, and, as before set forth, said spring is between the loose collar $i^6$ and the fixed collar $i^5$ on said rod $i^3$, and the lever $i^8$ is connected to the loose collar by links $i^7 i^7$. By bearing in mind that the lever $i^8$ is held in a fixed position when the foot-piece $i^9$ is depressed it will be apparent that as the wheels $h$ are lifted by the cable the levers $h^8$, links $i'$, and levers $i$ and rod $i^3$ can resume their normal position only by moving against the resistance of the spring $i^4$; hence the rollers $h^9$ will be kept in contact with the belts $h^3$, and said belts will be kept sufficiently tight during the upward movement of the arms $h'$ and $h^2$ and wheels $h$ and insure the rotation of the endless belt $f$ until the cable is clamped against said belt. As soon as the cable is gripped the engineer releases the foot-piece $i^9$ and the parts are returned to their normal position by the spring $i^4$ and the counter-weights $h^{15}$ upon the levers $h^8$.

In an application for patent, Serial No. 280,652, filed July 21, 1888, there is shown and described a combined air-pump and engine, the pump being used to force air into a reservoir and the engine for use in propelling the train short distances, and a reference is hereby made to said application for a more complete description of said combined air-pump and engine than is given herein. $l\,l$ represent the cylinders of said combined pump and air-engine, and the piston-rods $l'$ of these cylinders are connected to cranks upon one of the axles of the car-wheels. These pumps force air into the tanks $l^2$, and the compressed air is used for operating the grip and other uses hereinafter set forth. There is a regulator $l^3$ (see Fig. 4) for each pump, which prevents air being forced into the tanks after the maximum pressure of air in said tanks is reached; but as soon as the pressure diminishes said regulator allows more air to be forced into the tanks $l^2$. These tanks are shown by dotted lines in Fig. 2 and by full lines in Fig. 4. A second and smaller pair of these combined air-pumps and engines are shown by dotted lines at $l^4$, Fig. 2. These are also connected with the tanks $l^2$, and they may be used for rotating one of the shafts $f^2$, and thereby give motion to the endless belt instead of employing the wheels $h$ for said purpose. We have shown by dotted lines the piston-rods of said engines as connected to cranks upon one of the shafts of the drums $f'$.

We provide a shoe $l^5$ upon the under side of the stationary portion $c$ of the grip for the inner surface of the endless belt to be moved over or clamped against, and this shoe is of wrought-iron or other suitable material, and extends the entire length of the stationary portion of the grip, and said shoe is held in place by pins $l^6$, that pass through the plates $c^2$ and through said shoe. When this shoe becomes worn out, it can be removed by withdrawing the pins $l^6$ and another shoe substituted. If the endless belt should get wet or greasy, said belt might slip and be drawn through the grip by the cable after the grip had been applied, and the cable would not be firmly held by the grip. To prevent this we provide a brake-wheel $l^7$ upon the shaft $f^2$, so that said shaft $f^2$ may be prevented from turning if the belt should slip in the grip. When said shaft is held, the friction of the belt upon one of the drums $f'$ will be sufficient to prevent said belt slipping in the grip. Both shafts $f^2$, however, might be provided with brake-wheels. The brake for the wheel $l^7$ may be of any desired character. We have shown in Fig. 11 a lever $l^8$, that is to be brought down upon the periphery of the wheel $l^7$ when it is desired to hold said wheel and shaft and prevent their rotation.

By experiment we found that the friction of the cable upon the hook portion of the grip, when lifting up the cable and applying the grip, caused said hook to become highly heated, and said heat destroyed the temper of the metal of the hook, and the metal lost its hardness to such an extent that the hook was rapidly worn by the passage of the cable over it. To overcome this we cause water or other fluid to circulate through the interior of the hook, which prevents the hook being heated beyond the point which causes a circulation of the water through the hook, and as the water or other fluid is returned to the hook very cold said cold water speedily lowers the temperature of the hook and prevents the hook being injured.

Referring to Fig. 14, which shows an elevation of the moving part of the grip detached and of the tank and pipes for supplying water to the hook, $m$ is a small tank containing water, supported upon the flooring $m^{12}$ of the car, and from the lower part of the tank extends a flexible pipe $m'$, that is connected to a pipe $m^2$, that opens into the interior of the hook $d^3$ near one end thereof.

$m^3$ is a pipe that opens into the interior of the hook near the other end, and the upper end of said pipe $m^3$ is connected to the pipe $m^4$ by a flexible coupling $m^5$, the pipe $m^4$ opening into the tank above the pipe $m'$.

It is now to be understood that as soon as the hook $d^3$ becomes heated by the friction of the cable against said hook the water in the hook becomes heated, and the hot water ascends by the pipes $m^3$ $m^5$ $m^4$ to the tank, and the cooler water returns to the hook by the pipes $m'$ $m^2$. A constant circulation of water through the hook is thus maintained as long as the hook is heated, and this circulation of water by itself is sufficient to prevent the hook being injured by the heat; but we prefer to let the exhaust-air from the air-engines pass by a pipe $m^6$ to a tubular jacket $m^7$, that surrounds the pipe $m^4$, and this exhaust-air will cool the heated water in said pipe, so that the water will return cold to the tank, thereby causing the hook to be cooled much more quickly than by the use of water alone. The exhaust-air may be allowed to escape into the atmosphere from the jacket $m^7$; but we prefer to connect said jacket $m^7$ with the tank $m$ by a pipe $m^9$, which opens downwardly into said tank, so that the air may pass from the jacket into said tank and discharge as a jet into the water to more thoroughly cool the contents of said tank.

We have shown in Figs. 4 and 5 three passage-ways in the hook $d^3$ for the air or other fluid, and said passage-ways merge into one at the ends of the hook, and this single passage-way should run as far as possible into the ends of the hook in order that the ends of the hook shall be cooled as quickly as the central portion of the same.

In place of using water to cool the hook, all the exhaust-air from the engines may be allowed to pass through said hook. This may be accomplished by connecting the exhaust-pipe $m^6$ of each engine with a pipe connected to the pipe $m^2$ and allowing the air to enter one end of the hook and escape from a small opening at the other end of the hook.

In running upon curves it is necessary to employ guide-pulleys upon the car to keep the cable in a straight line where it passes through the grip, so that the cable will pass off from said guide-pulleys to the guide-pulleys upon the railway structure, and thereby avoid the wear upon the ends of the grip that would result if the cable passed off from the ends of the grip to the guide-pulleys upon the road-bed. The guide-pulleys upon the car are shown in pairs $n\ n$ at opposite ends of the grip, and each pair is placed as close as possible to the end of the grip. The axis of each pulley is supported in bearings upon an arm $n'$, depending from and cast in one with a plate $n^2$, which latter is connected to a plate $n^3$ by bolts $n^4$, that pass through slotted holes in the plate $n^3$, and this plate $n^3$ is bolted firmly to the beams $b\ b'$ and bar $n^{12}$.

There is a projection $n^5$ upon each plate $n^2$, that passes up through a slot in the plate $n^3$, and between said projection $n^5$ and the beam $b'$ there is a spring $n^6$, that tends to force the plate $n^2$ and the parts carried by it toward the side of the car, so as to keep the pulleys $n\ n$ away from the cable when the car is traveling upon a straight portion of the road.

To bring one pulley $n$ of each pair to the cable when traveling upon a curve of the road, we employ a guide-rail $n^7$, that is concentric with the curved portion of the track $a^2$, and this guide-rail acts upon rollers $n^8$, carried by the plates $n^2$. This guide-rail is outside of the inner rail of the curve and is supported above the cross-ties by brackets $n^9$, bolted to the wooden guard-rails $a^3$, and said guide-rail $n^7$ is so positioned that when the rollers $n^8$ upon one side of the car come in contact with said rail the rollers $n^8$, plates $n^2$, and pulleys $n$ upon said side of the car are moved toward the center of the car until the cable C is within the groove of the pulleys, so that the cable passes in a straight line through the grip from one pulley to the other, as illustrated in Fig. 6, and as this guide-rail extends the entire length of the curve it keeps the pulleys $n$ in this position while the car is traveling upon the curve. When the wheels leave the guide-rail as the car passes from the curved to the straight portion of the road, the springs $n^6$ move the plates $n^2$ and parts carried by them away from the center of the car, so that the pulleys $n$ do not touch the cable when the car is traveling upon the straight portion of the road. When a car is traveling upon the curve of a cable railway, the cable tends to draw the car sidewise toward the inner rail of the curved track, and the flanges of the wheels that travel upon said inner rail of the curve are pressed tightly against said rail, which causes great wear upon said flanges. Our rail $n^7$, which moved the pulleys $n$ to the cable, prevents the cable forcing the car toward the inner rail of the curve, because said rail keeps the pulleys $n$, against which the strain of the cable comes, in a fixed position in relation to the center line of the track. The axis of each pulley $n$ is placed at an inclination, so as to be able to use as large pulleys as possible within a given space, and the shaft or gudgeon for each wheel $n^8$ is supported in a bearing partly formed with the arm $n'$ and partly with a cap-plate $n^{15}$, that is bolted to said arm. The guide-pulleys $n^{16}$ upon the road-bed, as shown in the drawings, form the subject of a separate application for patent. In order to drop and pick up the cable automatically at the terminals of sections of the cable railway, we employ the devices next described.

The pawl-lever $e^8$, before referred to, is connected by a link $o'$ to a lever $o^2$, pivoted at $o^3$ to a bracket upon the beam $b'$, and one arm of said lever extends down and is adjacent to the inner wooden guard-rail $o^{12}$, and at the inner side of said guard-rail there is an incline $o^4$, which is located a short distance from the drum $o^{25}$, around which the cable of one section passes. (See Fig. 13.) The cable and car travel in the direction indicated by the arrow in Fig. 13, and as the lever $o^2$ comes in contact with said incline $o^4$ said lever $o^2$ is swung upon its pivot, and by the link $o'$ the lever $e^8$ is moved and disconnects the pawl $d^{17}$ from the wheel $e^6$. The weight of the moving part of the grip causes said moving part to drop as soon as the wheel $e^6$ is released, and the parts assume the position shown by dotted lines in Fig. 5, the cable being free of the grip. As the car moves on by momentum the hook $d^3$ of the grip comes in contact with the shear $o^5$, which swings the moving part of the grip upon its pivot-shaft $d^{13}$, and in so doing the hook $d^3$ of the grip is moved out from beneath the cable, and said shear $o^5$ keeps the hook in this position until the rear end of the hook has passed slightly beyond the drum $o^6$, around which the cable of the next section passes. As soon as the rear end of the hook has passed beyond said drum $o^6$ said hook $d^3$ will, by gravity, swing under the cable of the next section; but to insure its passing under said cable we provide an incline at $o^7$, which swings the hook under the cable with a positive movement, and finally brings said hook so that the groove in the latter is immediately below the cable, and when in this position an arm $o^8$ upon the car (see Fig. 4) comes in contact with an incline $o^9$ upon the guard-rail $o^{14}$.

This arm $o^8$ is connected to the plug of a cock $o^{10}$, and the movement of this arm, as the arm moves over the incline $o^9$, turns said cock to the position shown in Fig. 15 and allows compressed air to pass from the reservoir by the pipes $o^{11}$ $o^{22}$ to the interior of the cylinder $d^5$, and said air acts upon the plunger $d^4$ and lifts the same. The plunger being connected to the moving part of the grip, as before described, said moving part of the grip is also lifted, and the hook $d^3$ carries up the cable and the latter is clamped by the grip, so that the car will now be carried along by the cable. As soon as the arm $o^8$ has passed beyond the point $o^{13}$ of the incline $o^9$ a spring $o^{14}$ returns the arm $o^8$ to its normal position, and the cock $o^{10}$ is turned so that its passage-way coincides with the pipe $o^{22}$ and an opening at $o^{15}$ in the barrel of the cock, and the air escapes from the cylinder $d^5$, passing by said pipe $o^{22}$, cock, and opening $o^{15}$.

The plunger $d^4$ is to be provided with hydraulic packing, so that said plunger will fit perfectly air-tight in its cylinder, and we provide a spring $p'$ to wind up the chain upon the shaft $e^3$ when the moving part of the grip is lifted by the plunger, as just described.

It is to be understood that the pawl-lever $e^8$ is returned by gravity to its normal position, with the pawl $d^{17}$ in contact with the ratchet-wheel $e^6$, as soon as the lever $o^2$ passed beyond the incline $o^4$, and that said pawl-lever prevents the wheel $e^6$ and shaft $e^3$ turning backward during the upward movement of the plunger and the winding of the chain upon the shaft, and that the moving part of the grip cannot be again lowered until said pawl-lever is disconnected from the ratchet-wheel $e^6$. The spring $p'$ is shown in Fig. 5 only. One end of said spring is connected to the shaft $e^3$ and the other end to a stud projecting from the cylinder $d^5$, and said spring is wound up every time the moving part of the grip is lowered, and it is to be of sufficient strength to rotate the shaft and wind up the chain thereon when the moving part of the grip is lifted, as before described. It is very important that the grip shall be so constructed that it will yield slightly and allow the cable to slide through the grip at times when the grip is being applied to portions of the cable where the diameter of the cable is slightly increased—such as at splicings—for if the car is only partially gripped to the cable and is not moving at the same speed as the cable, and an enlargement of the cable should pass into the grip, said enlarged portion would not slip through the grip and the car would move forward with a jerk at the same speed as the cable.

We provide a spring $q$, connected to the chain or other connection $e^7$ from the toggle-lever $e'$ to the shaft $e^3$, so that if an enlarged part of the cable should enter the grip while the latter is being applied said spring will be compressed by the increased pressure on the hook of the grip and allow said hook to drop sufficiently for the enlarged part of the cable to slide through the grip without giving any jerk to the car that is only partially gripped to the cable. We have shown said spring $q$ as within a cylinder $q'$ and between one head of said cylinder and a head upon a rod $q^2$, that is connected to one part of the chain $e^7$, the cylinder $q'$ being connected to the other part of said chain.

The spring $q$ might have its two ends connected directly to the two parts of the chain; but we prefer the construction shown, for if the spring $q$ should break under the strain to which it may be subjected there will still be a firm connection between the two parts of the chain by the cylinder $q'$ and rod $q^2$, and the moving part of the grip will be prevented from dropping.

In the application, Serial No. 306,837, filed April 11, 1889, of John H. Pendleton and Andrew Bryson, Jr., the guard-rail $n^7$, as a part of the railway structure against which the wheel on the car is to act, is broadly claimed, and hence is not claimed herein except as an element in connection with parts of the car.

We claim as our invention—

1. The combination, with the stationary part of the grip and a support for the same, of a moving part having a hook at its lower end, a pivot-shaft for said hook to swing upon, means for raising and lowering said shaft, an endless belt against which the cable is clamped, and drums for supporting said belt, substantially as specified.

2. The combination, with the stationary part of the grip and a support for the same, of a moving part having a hook at its lower end, a pivot-shaft for said hook to swing upon, means for raising and lowering said shaft, an endless belt against which the cable is clamped, drums for supporting said belt, and means for rotating said drums and endless belt, substantially as specified.

3. The combination, with the stationary and moving part of the grip, the latter having a hook-shaped lower end, of an endless belt against which the cable is clamped, shafts and drums for supporting said belt, means for rotating said shafts and drums, a brake-wheel upon one of the shafts of said drums, and a brake for arresting the rotation of said brake-wheel and its shaft, substantially as and for the purposes specified.

4. The combination, with the stationary part of the grip and a support for the same, of the moving part of the grip, having a hook at its lower end, the cylinder $d^5$ and its plunger, the shaft $d^{13}$, passing through the plunger and supporting the moving part of the grip, the lever $e'$ and arms $e$, the shaft $e^3$, ratchet-wheel $e^6$, and pawl-lever $e^8$, and the chain $e^7$, connecting the shaft $e^3$ to the lever $e'$, substantially as specified.

5. The combination, with the stationary part of the grip, a support for the same, the moving part of the grip, the cylinder $d^5$, plunger $d^4$, and shaft $d^{13}$, of the lever $e'$, arms $e$, the shaft $e^3$, ratchet-wheel $e^6$ and its pawl, the chain $e^7$, connected with said shaft $e^3$ and toggle-lever, and a spring connected with said chain, for the purposes specified.

6. The combination, in a gripping device for cable railways, of the stationary part of the grip, a pivoted moving part, means for lowering and raising said moving part of the grip, and a yielding connection to the moving part of the grip, so that said moving part may yield if the cable is obstructed in its passage in the grip, as set forth.

7. The combination, with the stationary and moving part of the grip, means for operating said moving part, the endless belt $f$, and shafts and drums for supporting said belt $f$, of the arm $h'$, pivoted upon one of said shafts, the wheel $h$, carried by said arm $h'$, the pulleys $h^2$ $h^4$ and band $h^{12}$, and means, substantially as specified, for lowering the wheel $h$, for the purposes set forth.

8. The combination, with the stationary and moving part of the grip, means for operating said moving part, the endless belt $f$, shafts and drums for supporting said belt, the arms $h'$, wheels $h$, pulleys $h^2$ $h^4$, bands $h^3$, levers $h^8$, $i$, and $i^8$, links $i'$, the arms $h^{12}$ and rollers $h^9$, a connection between the arms $h'$ and $h^{12}$, and a yielding connection between the lever $i$ and the lever $i^8$, substantially as and for the purposes set forth.

9. The combination, with the stationary and moving part of the grip and means for operating said moving part, of the endless belt $f$, formed of bands of leather or other material, to which blocks of leather are secured, and means for supporting said endless belt, substantially as and for the purposes specified.

10. The combination, with the gripping device and the car-frame and its wheels and axles, of the pairs of pulleys $n$, supports for said pulleys fitted to move upon the car-frame, the springs $n^6$, the wheels $n^8$, carried by said pulley-supports, and a rail $n^7$, supported upon the cross-ties for moving and keeping the pulleys upon one side of the car into contact with the cable when the car is traveling upon a curved portion of the road, as set forth.

11. The combination, with the cable railway, the car, and its wheels and axles, a gripping device upon the car, and guide-pulleys and their supports, also upon the car, of a rail supported upon the railway structure at the curved portion thereof to act upon said guide-pulleys and keep the cable toward the center of the curved track, substantially as set forth.

12. The combination, with the stationary and moving part of the grip, the toggle-arms, chain, shaft, ratchet-wheel, and pawl-lever for holding up the moving part of the grip, of the lever $o^2$, connected to the pawl-lever by a link, an incline $o^4$ upon the roadway for disconnecting the pawl-lever and allowing the moving part of the grip to drop, and the shear $o^5$ for moving the hook of the grip from under the cable, substantially as and for the purposes specified.

13. The combination, with the stationary and moving part of the grip, of the plunger $d^4$, connected to said moving part of the grip, the toggle-arms, shaft $e^3$, chain, ratchet-wheel, and pawl-lever, the spring $p'$, connected to said shaft $e^3$, the cylinder $d^5$, a reservoir containing compressed air, a pipe connecting said reservoir with the plunger-cylinder, a cock in said pipe, an arm connected with the plug of said cock, and an incline $o^9$ upon the roadway for moving said arm and opening the cock to admit compressed air to the plunger-cylinder and lift said plunger and the moving part of the grip, as specified.

14. The combination, with the gripping device, the car upon which it is mounted, a reservoir containing compressed air upon said car, the inclines $o^4$ $o^7$ $o^9$, and shear $o^5$ upon the roadway, and mechanism, substantially as specified, operated by said inclines, so that at the terminals of cable-sections the moving part of the grip is dropped and swung out from beneath one section of cable and then swung under and lifted to connect the cable of the next section with the grip, as specified.

15. The combination, with the stationary and moving part of the grip, and means, substantially as specified, for supporting said moving part of the grip, of the links $e^{11}$ $e^{12}$ and rod $e^{10}$, for swinging the moving part of the grip by hand, as set forth.

16. The combination, with the stationary and moving part of the grip and the endless belt against which the cable is clamped, of a shoe of wrought-iron or other suitable material upon the stationary portion of said grip, against which shoe the inner surface of the endless belt is pressed when the cable is clamped by the grip, as set forth.

17. The combination, with the stationary part of the grip, of the moving part of the grip, having a hollow hook, a tank containing water or other fluid, and pipes connecting the respective ends of the hook with said tank, so that water or other fluid is caused to circulate through the hook as soon as the latter becomes heated, as set forth.

18. The combination, with the stationary part of the grip, of the moving part having a hollow hook, a tank containing water or other fluid, pipes connecting the respective ends of the hook with the tank, and a jacket for receiving exhaust compressed air surrounding the return water-pipe, so that the water or other fluid in the pipes and tanks is cooled by exhaust compressed air, as set forth.

19. The combination, with the stationary part of the grip, of the moving part having a hollow hook, a tank containing fluid, and pipes connecting the grip with said tank, so that the fluid is caused to circulate through the grip as the latter becomes heated, substantially as set forth.

20. The combination, with the grip mechanism, one part of which is hollow, of a fluid-supplying device that causes the fluid to pass through the hollow part of the grip for cooling the same, substantially as specified.

21. The combination, in a grip for cable railways, of an endless belt against which the cable is clamped and means for putting said belt in motion prior to the contact of the cable with said belt, substantially as specified.

22. The combination, in a grip for cable railways, of an endless belt against which the cable is clamped, drums for supporting said belt, a wheel that is rotated by the cable, and a connection between said wheel and one of said drums for giving motion to said endless belt, substantially as specified.

Signed by us this 19th day of July, 1888.

CORNELIUS TIERS.
J. H. PENDLETON.
A. BRYSON, JR.

Witnesses:
GEO. T. PINCKNEY,
WILLIAM G. MOTT.